May 28, 1935.  H. M. POTTER  2,002,582
KNOCK-DOWN BASKET
Filed Nov. 3, 1933
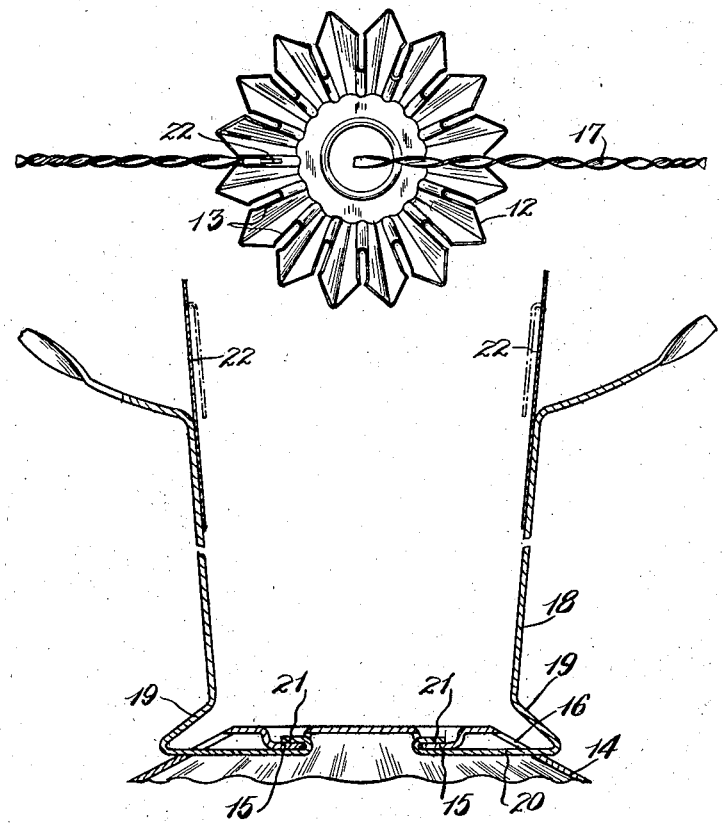
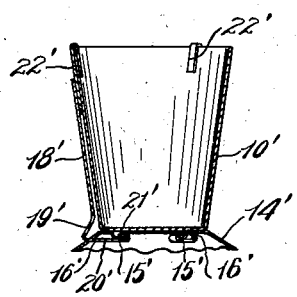
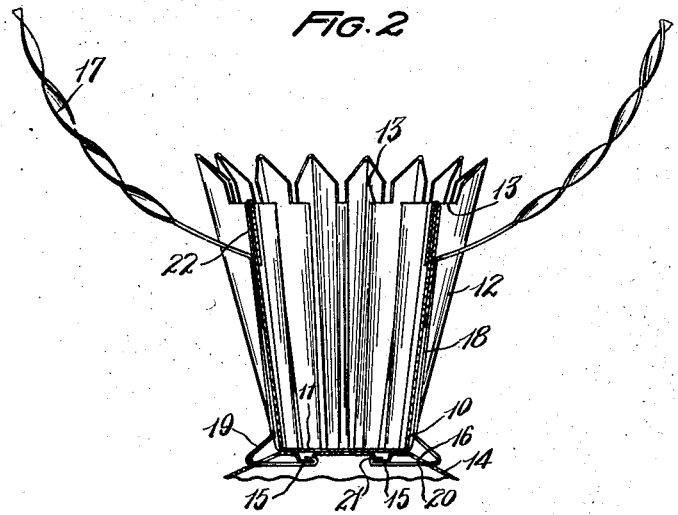
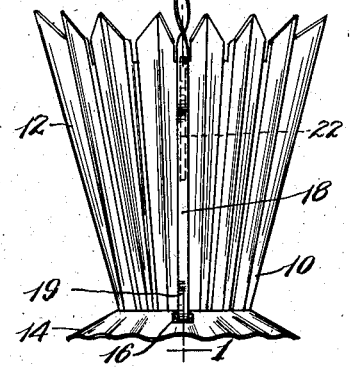
INVENTOR:
HOWARD M. POTTER
ATTORNEYS Patented May 28, 1935

2,002,582

UNITED STATES PATENT OFFICE 2,002,582

KNOCK-DOWN BASKET

Howard M. Potter, Youngstown, Ohio

Application November 3, 1933, Serial No. 696,560

14 Claims. (Cl. 220—4)

This invention relates to improvements in knock-down baskets, and has reference particularly to metal baskets for use primarily as floral containers.

In order to secure favorable freight rates it is highly desirable to be able to nest the container portions of the baskets together during shipment, and one of the objects of the present invention is the provision of a knock-down basket of such character as to make possible the nesting together of the body or container portions of a series of baskets.

Another object is the provision of a basket having its parts so formed and arranged that they may be assembled readily and quickly, and such that, when so assembled, they will be effectively locked together.

A further object is the provision of a base separate from the liquid-tight container, and means for detachably clamping together the base and container without in any way weakening the container or detracting from its liquid holding capabilities, the handle being used for this clamping function when a handle is employed.

Other objects and features of novelty will appear as I proceed with the description of those embodiments of the invention which, for the purposes of the present application, I have illustrated in the accompanying drawing, in which Figure 1 is an elevational view partly in central vertical section of a floral basket embodying the invention.

Fig. 2 is a vertical sectional view on a larger scale of the base and handle in assembled relation, the container being removed.

Fig. 3 is a top plan view of the complete basket.

Fig. 4 is an elevational view taken at right angles to Fig. 1, and

Fig. 5 is a view on a smaller scale illustrating the invention as applied to a container having no handle and intended to be employed as an urn or a vase.

In the drawing I have illustrated at 10 a one-piece sheet metal container comprising a bottom 11 and upstanding fluted sides 12 which are preferably inclined outwardly and upwardly so that a series of containers may be nested together and packed to occupy a relatively small space. By virtue of this arrangement a favorable freight classification may be obtained.

The upper edge of the container may be finished in various ways, this detail of the construction relating principally to appearance and being controlled largely by the taste or preference of the designer. In the present instance I have shown the folds 13 between adjacent flutes cut away at their upper ends so as to provide the effect of shallow slots in the folds between the upper pointed ends of the flutes. The container, when bent up of a single piece of metal, as in my preferred construction, contains no seams or other possible points of leakage, nor are any fastenings, such as rivets or the like, mounted in the container for attaching thereto the handle or base.

The base 14 is formed preferably of sheet metal. It has a flat supporting surface of approximately the same size as the bottom 11 of the container, which rests upon the supporting surface when the parts are assembled. Extending downwardly and outwardly from this supporting surface, and integral therewith, there is a surrounding rim of generally conical shape which, however, is preferably crimped or corrugated in such a manner as to take up the extra metal resulting from the angle between this rim and the central supporting portion of the base. The base member 14 is therefore hollow, and a space is provided between its lower surface and any flat surface upon which the basket may be placed.

In the form of the invention illustrated in Figs. 1 to 4 inclusive, two lips 15 are struck out of the metal of the base in alignment with each other, and are caused to project into the space beneath the base. At points in the downwardly inclined rim of the base, spaced a short distance outwardly from the lips 15, I form slots or openings 16. 17 is a loop handle, preferably formed of a single strip of metal twisted throughout the intermediate portion of its length. Obviously a somewhat different type of handle could be employed without deviating from the spirit of the invention.

Near its extremities the strip metal of the handle is preferably left untwisted, and these ends include upstanding handle portions 18 which are preferably so formed as to stand approximately parallel to each other before the parts are assembled. The parts 18 before assembly may however be inclined outwardly at approximately the same angle as the walls 10 of the container, if desired. Below each upstanding portion 18 there is a short downwardly and outwardly inclined portion 19, and then an inwardly extending substantially horizontal portion 20 ending in a return bend or hook 21.

Near the upper ends of the upstanding portions 18 of the handle I attach, as by means of welding, strips or wires 22 of relatively small cross section. These strips or wires 22 are composed of soft pliant metal so treated as to have substantially no elasticity.

In that form of the invention illustrated in Fig. 5, the container 10' is shown as one having side walls of regular curvature, that is to say the container is circular in horizontal cross section. The upper edge furthermore is not serrated as in the other figures of the drawing. It will be apparent however that a container like that in the first described form of the invention can be employed if desired. The base 14' is similar to the base 14, but differs in that it is provided with three side openings 16', spaced 120° apart, and in that it has three lips 15' struck downwardly from its flat supporting portion, the lips 15' being located opposite or in radial alignment with the corresponding opening 16'. There are three clamping strips or tie members cooperating with the three lips 15', and these tie members each comprise an upstanding portion 18', an outwardly inclined portion 19' and an inwardly extending horizontal portion 20' with a hook 21' on its extremity, all corresponding in form and function with the parts 18, 19, 20 and 21 of the previously described form of the invention.

Near the upper end of the upstanding portion 18' of each tie member there is welded, or otherwise secured, a pliant inelastic strip or wire 22', similar to the strip or wire 22, which is bent over the upper edge of the container when the parts are assembled. Two clamping strips or tie members of the kind described are sufficient when a fluted container is employed, but for a plain container such as shown in Fig. 5, three or more clamping strips are desirable although not essential. In some cases it may be desirable to make the entire clamping element or tie member of pliant inelastic metal.

When the parts of the basket, illustrated in Figs. 1 to 4 inclusive, are to be assembled by the florist who has purchased them in knock-down condition, the horizontal ends 20 of a handle are caused to enter the openings 16 in the base, the handle being so formed that its natural resilience tends to hold the lower extremities further apart than they are in the assembled basket. Each lower extremity is then pushed inward until the hook 21 clears the lip 15, after which the handle extremities tend to spring outwardly, or may be pulled outwardly, to cause the hook 21 to embrace the lip 15, as illustrated in Figs. 1 and 2.

The person assembling the basket then takes a container 10, fits it into the space between the upper ends of the upstanding portions 18 of the handle, with the said handle portions entering diametrically opposed grooves between flutes. The container is then lowered until the bottom 11 thereof engages the central supporting part of base 14. The operator then grasps the upwardly protruding extremity of one of the pliant metal elements 22 and folds it down snugly over the upper edge of the container at one of the folds 13. The same procedure is then followed with respect to the other element 22. When these operations are completed the parts are all firmly locked together and the container and base are clamped to each other. It will be apparent that the hooks 21 cannot be accidentally disengaged from the lips 15 so long as the container is in position between the upstanding portions 18 of the handle, because the container prevents the handle portions 20 from being moved inwardly far enough to disengage the hooks from the lips.

The method of assembling the urn or vase of Fig. 5 with its base is substantially the same as that above given for the basket, and it will be apparent that the base and container are firmly held in assembled relation by the clamps or tie members illustrated, and that no accidental disengagement of the hooks 21' and lips 15' is possible so long as the container is in position upon the base.

Variations from the described structure may be employed. Accordingly I desire it to be understood that the scope of the invention is to be regarded as defined exclusively by the appended claims rather than by the foregoing description or the accompanying illustration.

Having thus described my invention, I claim:

1. A floral basket comprising a container having a bottom and sides, a loop handle formed of strip material having inwardly extending lower ends, means beneath the container for releasably joining said ends, and means along opposite sides of the container adapted to receive opposite portions of the handle and thereby prevent relative lateral movement between the container and handle.

2. A floral basket comprising a container having a bottom and sides, a handle having upstanding side portions and inwardly extending lower extremities of strip material, means beneath the container for releasably joining said extremities, said means being disconnectible from said handle extremities only upon relative movement of the handle extremities toward each other, said container when placed in position between said upstanding portions of the handle filling the space between said upstanding portions and preventing the accidental disengagement of the handle extremities.

3. A floral basket comprising a container having a bottom and sides, a handle having upstanding side portions and inwardly extending lower extremities of strip material, means beneath the container for releasably joining said extremities, said means being disconnectible from said handle extremities only upon relative movement of the handle extremities toward each other, said container when positioned between said upstanding portions of the handle filling the space between said upstanding portions and preventing the accidental disengagement of the handle extremities, and means for maintaining said container and said upstanding portions of the handle in operative relation to each other.

4. A floral basket comprising a container having a bottom and sides, a handle having upstanding side portions and inwardly extending lower extremities of strip material, means beneath the container for releasably joining said extremities, said means being disconnectible from said handle extremities only upon relative movement of the handle extremities toward each other, said container when positioned between said upstanding portions of the handle filling the space between said upstanding portions and preventing the accidental disengagement of the handle extremities, means along opposite sides of the container adapted to receive the upstanding portions of the handle and thereby prevent relative lateral movement between the container and handle, and means mounted upon said upstanding portions adapted to be releasably connected with the upper edge of the container for preventing upward movement of the container relative to the handle.

5. A floral basket comprising a container having a bottom and sides, a handle having upstanding side portions and inwardly extending lower extremities of strip material, means beneath the container for releasably joining said extremities, said means being disconnectible from said handle extremities only upon relative movement of the handle extremities toward each other, said container when positioned between said upstanding portions of the handle filling the space between said upstanding portions and preventing the accidental disengagement of the handle extremities, means along opposite sides of the container adapted to receive the upstanding portions of the handle and thereby prevent relative lateral movement between the container and handle, and a strip of pliant inelastic metal secured to each upstanding side portion of the handle and adapted to be bent down over the upper edge of the container for preventing upward movement of the container relative to the handle.

6. A floral basket comprising a sheet metal container having a bottom and sides, a handle having upstanding side portions embracing opposite side portions of the container, means for releasably attaching the lower ends of the handle to the basket at the bottom thereof, and a strip of pliant inelastic metal secured to each upstanding side portion of the handle and adapted to be bent down over the upper edge of the container for preventing upward movement of the container relative to the handle.

7. A floral basket comprising a container having a bottom and sides, a base for said container, and means for clamping the container to the base comprising a plurality of tie members positioned along the sides of the container, means for securing said tie members to the base, said securing means being detachable only when the container is removed from the base, and means for detachably securing said tie members to the container at the upper edge thereof.

8. A knock-down basket comprising a base, a container, and a handle, said base and handle including interengaging means capable of being assembled or disassembled only when said container is not in position upon the base.

9. A knock-down basket comprising a base, a container, and a handle, said base and handle including interengaging means capable of being assembled or disassembled only when said container is not in position upon the base, and means adapted to be brought into operative position after the handle and base are assembled in interengaging position, for holding the container down upon the base.

10. A knock-down basket comprising a base, a container having a bottom and sides, the sides being fluted lengthwise, a separate handle, said base and handle including interengaging means capable of being assembled or disassembled only when said container is not in position upon the base, the handle having side portions extending upwardly from the base between flutes of the container.

11. A knock-down basket comprising a base, a container having a bottom and sides, the sides being fluted lengthwise, a separate handle, said base and handle including interengaging means capable of being assembled or disassembled only when said container is not in position upon the base, the handle having side portions extending upwardly from the base between flutes of the container, and means for securing the side portions of the handle to the container at approximately the upper edge thereof.

12. A floral basket comprising a sheet metal container having a bottom and sides, a sheet metal base for said container, and means for clamping the container to the base comprising a plurality of elongated tie members detachably secured to the base, extending upwardly along the sides of the container, said tie members comprising pliant inelastic metal portions adapted to be bent over the upper edge of the container.

13. A knock-down basket comprising a base of inverted dish shape provided with opposed openings in the sides thereof, a container having a bottom adapted to rest upon said base, a separate handle having side portions extending along the sides of said container and lower inturned end portions projecting through said openings, and means for detachably connecting said inturned portions of the handle to the base, whereby the attaching means are concealed by the container.

14. A knock-down basket comprising a base of inverted dish shape provided with opposed openings in the sides thereof, a container having a bottom adapted to rest upon said base, a separate handle having side portions extending along the sides of said container and lower inturned end portions projecting through said openings, and means for detachably connecting said inturned portions of the handle to the base, said attaching means being such as to require inward movement of the inturned ends for detachment from the base, whereby detachment of the handle can be effected only when the container is removed.

HOWARD M. POTTER.